(12) United States Patent
Ogawa et al.

(10) Patent No.: US 7,667,844 B2
(45) Date of Patent: Feb. 23, 2010

(54) LINE SENSOR AND PRINTING PRESS

(75) Inventors: Masayasu Ogawa, Mihara (JP); Shuichi Takemoto, Mihara (JP); Kazushi Okamoto, Mihara (JP); Seishi Oda, Fukuyama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 166 days.

(21) Appl. No.: 11/896,377

(22) Filed: Aug. 31, 2007

(65) Prior Publication Data

US 2008/0055585 A1 Mar. 6, 2008

(30) Foreign Application Priority Data

Sep. 4, 2006 (JP) .............................. 2006-239280

(51) Int. Cl.
*G01N 21/25* (2006.01)
(52) U.S. Cl. ..................................... 356/404
(58) Field of Classification Search ................. 356/402, 356/406, 51, 446
See application file for complete search history.

(56) References Cited

U.S. PATENT DOCUMENTS 5,304,813 A * 4/1994 De Man ...................... 250/556

FOREIGN PATENT DOCUMENTS

| JP | S60-125507 | 7/1985 |
|---|---|---|
| JP | 2003-4647 | 1/2003 |
| JP | 2003-291312 | 10/2003 |
| JP | 2004-226262 | 8/2004 |
| JP | 2006-168287 | 6/2006 |

* cited by examiner

*Primary Examiner*—Gregory J Toatley, Jr.
*Assistant Examiner*—Abdullahi Nur
(74) *Attorney, Agent, or Firm*—Kanesaka Berner and Partners LLP

(57) ABSTRACT

A line sensor includes a light source section for irradiating light of a plurality of colors to an inspecting object, and a light-receiving section for detecting reflected light from the inspecting object. The light source section has a plurality of light sources for each of the plurality of colors. The light-receiving section has a plurality of light-receiving sensors disposed in a row. The light sources are disposed in two rows so that the light-receiving section is interposed between the two rows. The light sources of the plurality of colors are divided into a first color light source group and a second color light source group. First disposition patterns, in which the light sources of the first color light source group are disposed in one of the two rows and the light sources of the second color light source group are disposed in the other row, and second disposition patterns, in which the first and second color light source groups are disposed in positions opposite to the first disposition pattern, are alternately disposed.

18 Claims, 7 Drawing Sheets

PAPER CONVEYING DIRECTION →

PAPER CONVEYING DIRECTION →

PAPER CONVEYING DIRECTION

LINE SENSOR AND PRINTING PRESS

BACKGROUND OF THE INVENTION (1) Field of the Invention

The present invention relates to a line sensor (line-shaped sensor) for detecting light reflected from an inspecting object such as printed paper, and a printing press equipped with the line sensor.

(2) Description of the Related Art

Conventionally, there is a printing press equipped with a line sensor for reading light reflected from a printed image on printing paper to inspect the printed image (e.g., see Japanese Patent Laid-Open Publication No. 2003-291312).

SUMMARY OF THE INVENTION

It is an object of the present invention to provide a line sensor that is capable of accurately detecting the color tone of an inspecting object such as printing paper, and a printing press equipped with the line sensor.

To achieve this end, a line sensor according to the present invention comprises a light source section for irradiating light of a plurality of colors to an inspecting object, and a light-receiving section for detecting reflected light from the inspecting object. The light source section has a plurality of light sources for each of the plurality of colors. The light-receiving section has a plurality of light-receiving sensors disposed in a row in a width direction of the inspecting object. The light sources are disposed in two rows so that the light-receiving section is interposed between the two rows.

In a preferred form of the present invention, the light sources of the plurality of colors are divided into a first color light source group and a second color light source group; the light sources of the first color light source group are disposed in one of the two rows of the light source section; and the light sources of the second color light source group are disposed in the other row.

In another preferred form of the present invention, the light sources of the plurality of colors are divided into a first color light source group and a second color light source group; and first disposition patterns, in which the light sources of the first color light source group are disposed in one of the two rows of the light source section and the light sources of the second color light source group are disposed in the other row, and second disposition patterns, in which the light sources of the second color light source group are disposed in the one row and the light sources of the first color light source group are disposed in the other row, are alternately disposed in a row direction.

Note that the kind of color that is contained in the first and second color light sources may be one kind. The inspecting object may be continuous web or printing sheets. The inspecting object may also be printed corrugated cardboard sheets, metal sheets, or resin film.

The light-receiving sensors may be disposed in a straight line in the width direction of the inspecting object.

Therefore, even if a difference occurs between the light quantities supplied by the light irradiated from the first light source section and light irradiated from the second light source section because of an installing error caused when installing the line sensor, the occurrence of non-uniformity in the light quantity of each color can be prevented or reduced. Thus, the color tone of the inspecting object can be accurately sensed.

It is preferable that the two rows of the light source section be disposed so that the two rows are plane-symmetrical with respect to the light-receiving section and the inspecting object. This makes it possible for each light source section to evenly irradiate light.

It is also preferable that the light sources of each color be disposed to correspond one by one to one light-receiving sensor of the light-receiving section. Because each light-receiving sensor has a light source of each color, a sufficient quantity of light can be irradiated without having more sensors than is necessary.

It is also preferable that the plurality of colors be infrared, red, green, and blue colors. This makes it possible to accurately read the color tone of an inspecting object containing black ink (K).

Preferably, the first color light source group comprises the light sources of two colors of the infrared, red, green, and blue colors, and the second color light source group comprises the light sources of the remaining two colors. This makes it possible to reduce a difference in light quantity resulting from an installing error caused when installing the line sensor, and to irradiate light to an inspecting object efficiently without increasing the number of light sources for one light-receiving section.

It is preferable that irradiated light adjustment lenses be provided between the light sources and the inspecting object to adjust light irradiated from the light sources. This increases the directivity and diffusion of light irradiated from the light sources, whereby the light reflected from the inspecting object can be accurately read.

It is also preferable that a reflected light adjustment lens be provided between the inspecting object and the light-receiving section to adjust a light quantity of the reflected light going from the inspecting object to the light-receiving section. This enables the light-receiving section to receive most of the reflected light from the inspecting object, whereby the light-receiving section can accurately read the reflected light.

Each of the light sources preferably comprises a light-emitting diode. This can reduce the power cost required for light irradiation and also reduce the occurrence of heat when irradiating light.

In accordance with the present invention, there is provided a printing press comprising a printing section for printing on printing paper as the inspecting object and the aforementioned line sensor provided downstream of the printing section.

It is preferable that the printing press further include a guide roller for guiding the printing paper along a traveling route. It is also preferable that the line sensor be disposed at a position facing the guide roller across the traveling route. This reduces the flapping of paper, and the guide roller prevents light from being transmitted through paper, so reflected light can be accurately detected.

BRIEF DESCRIPTION OF THE DRAWINGS

The present invention will be described in further detail with reference to the accompanying drawings wherein.

DESCRIPTION OF THE PREFERRED EMBODIMENTS

An embodiment of the present invention will hereinafter be described in detail with reference to the accompanying drawings.

Figure 1:
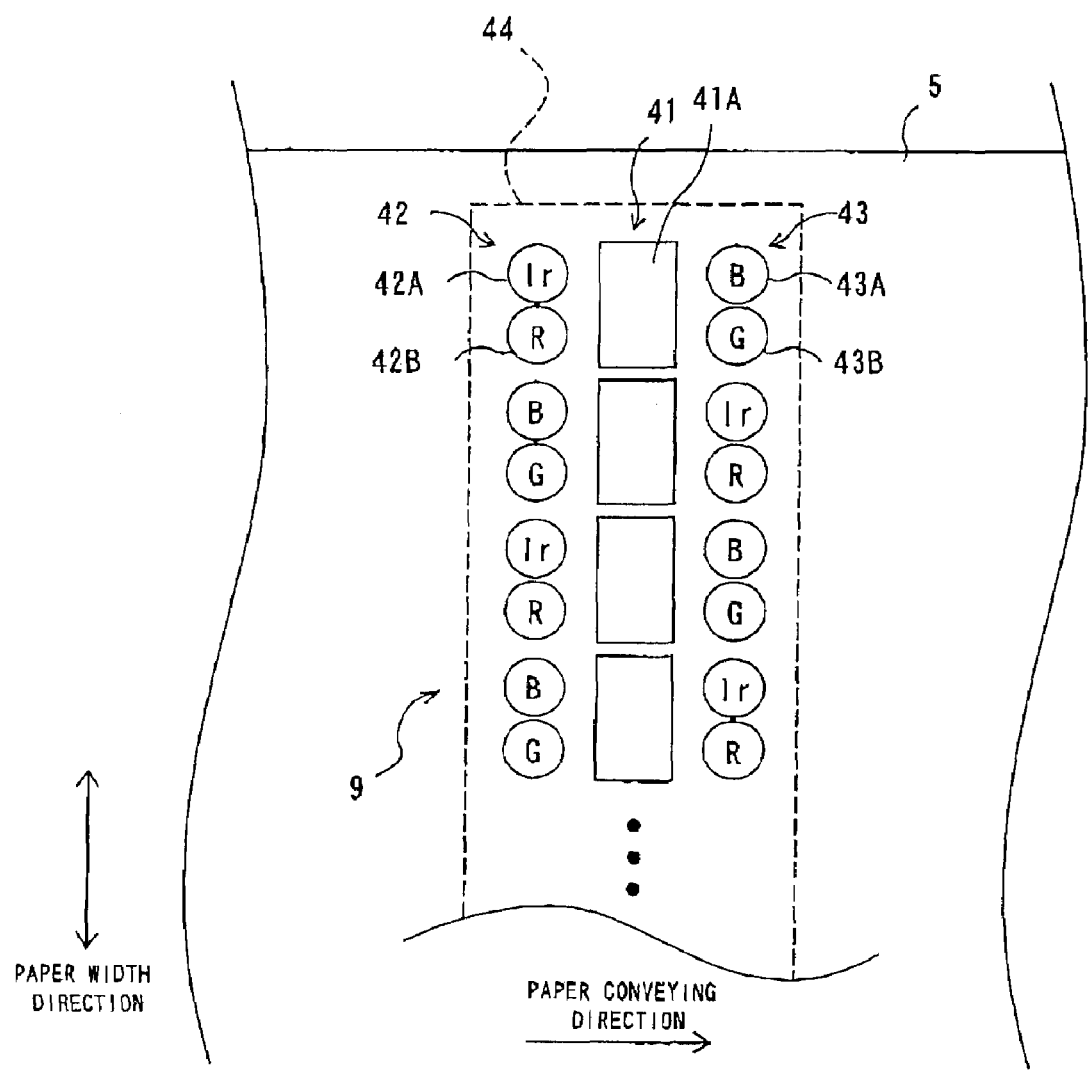
FIG. 1 is used to explain a line sensor and a printing press according to an embodiment of the present invention and is a plan view schematically showing a configuration of the line sensor.
Figure 2:
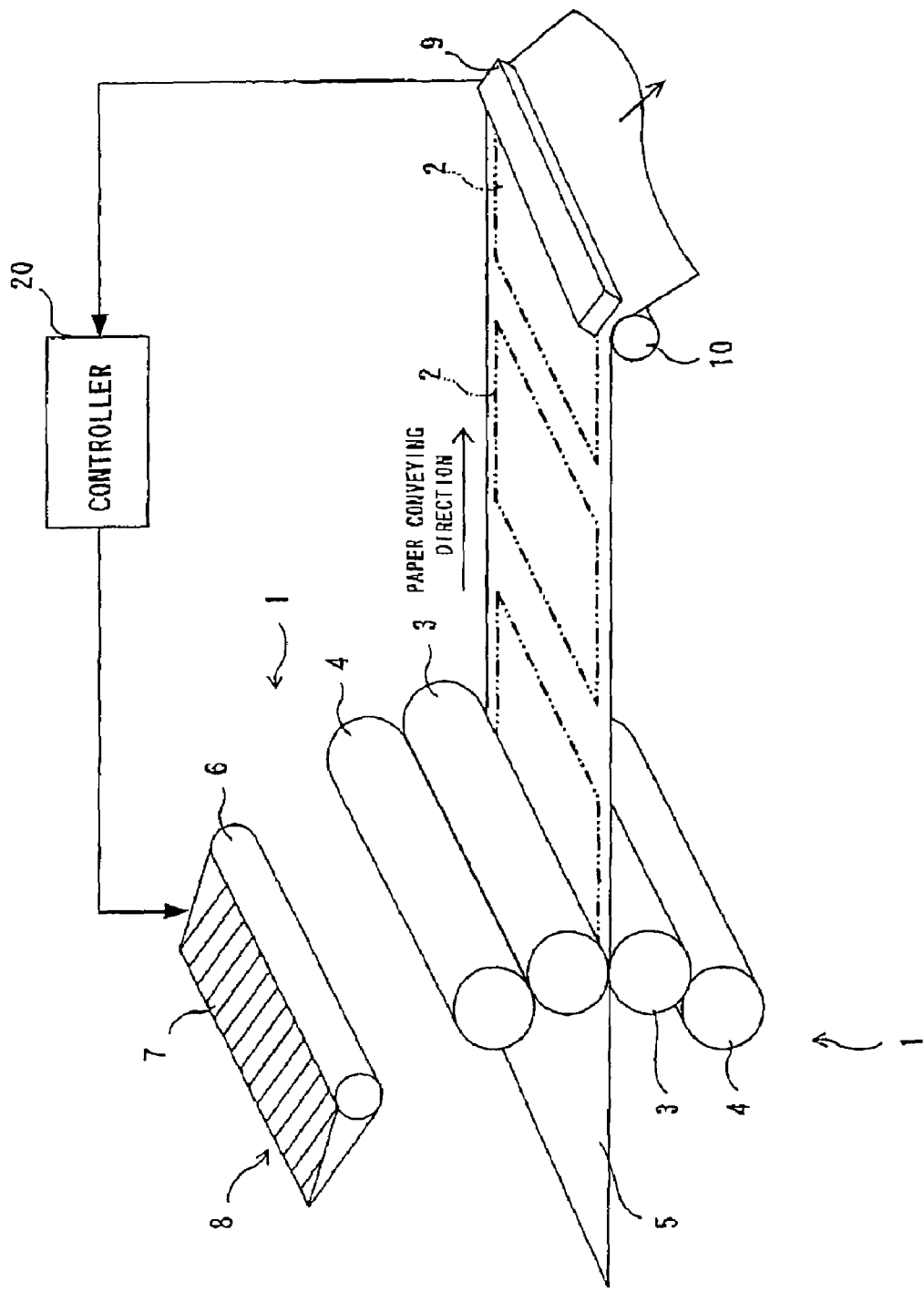
FIG. 2 is used to explain the line sensor and the printing press according to the above embodiment and is a perspective view showing a simplified configuration of the printing section of the printing press equipped with the line sensor.
Figure 3:
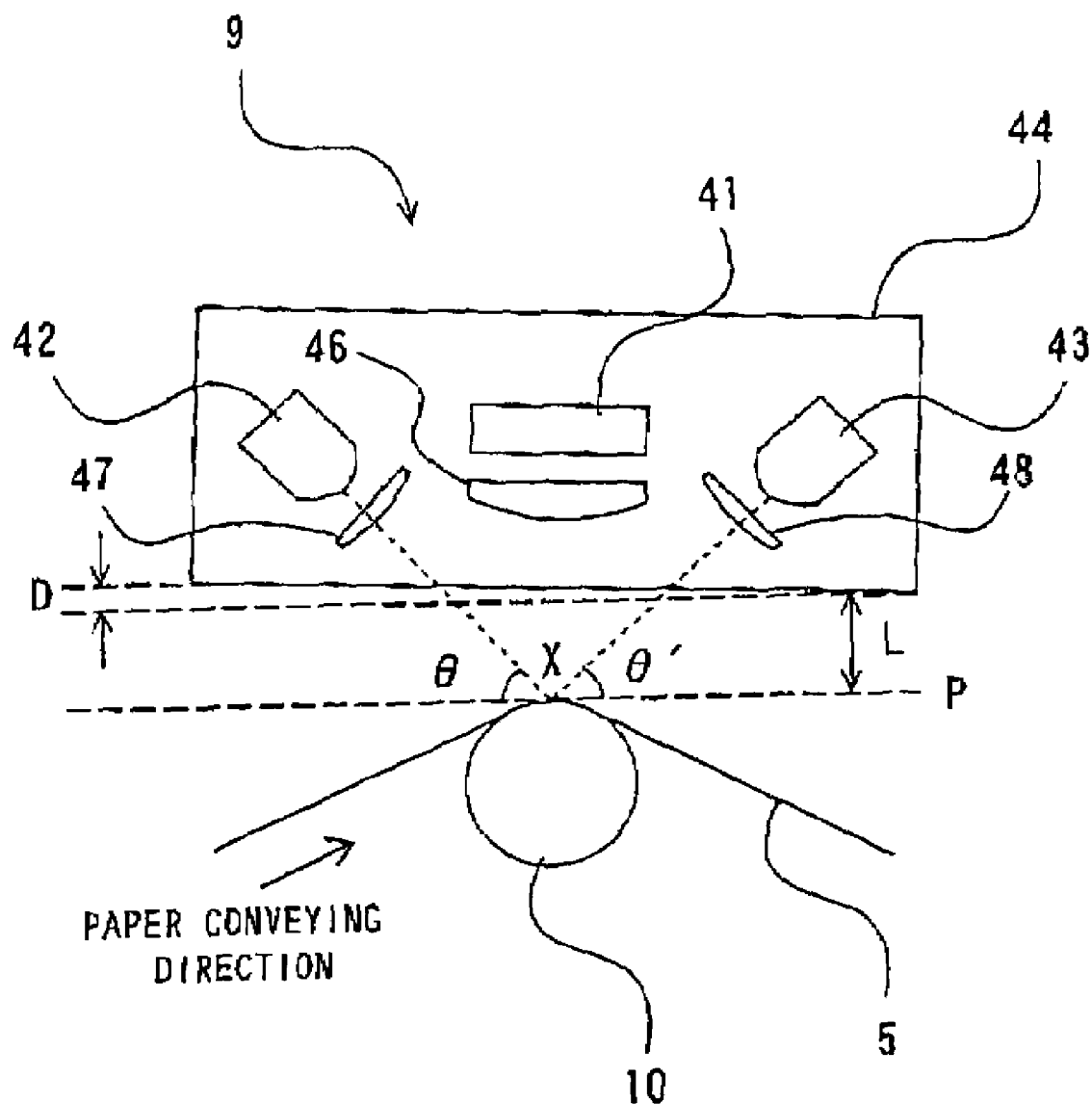
FIG. 3 is used to explain the line sensor and the printing press according to the above embodiment and is a side view schematically showing the line sensor.
Figure 4:
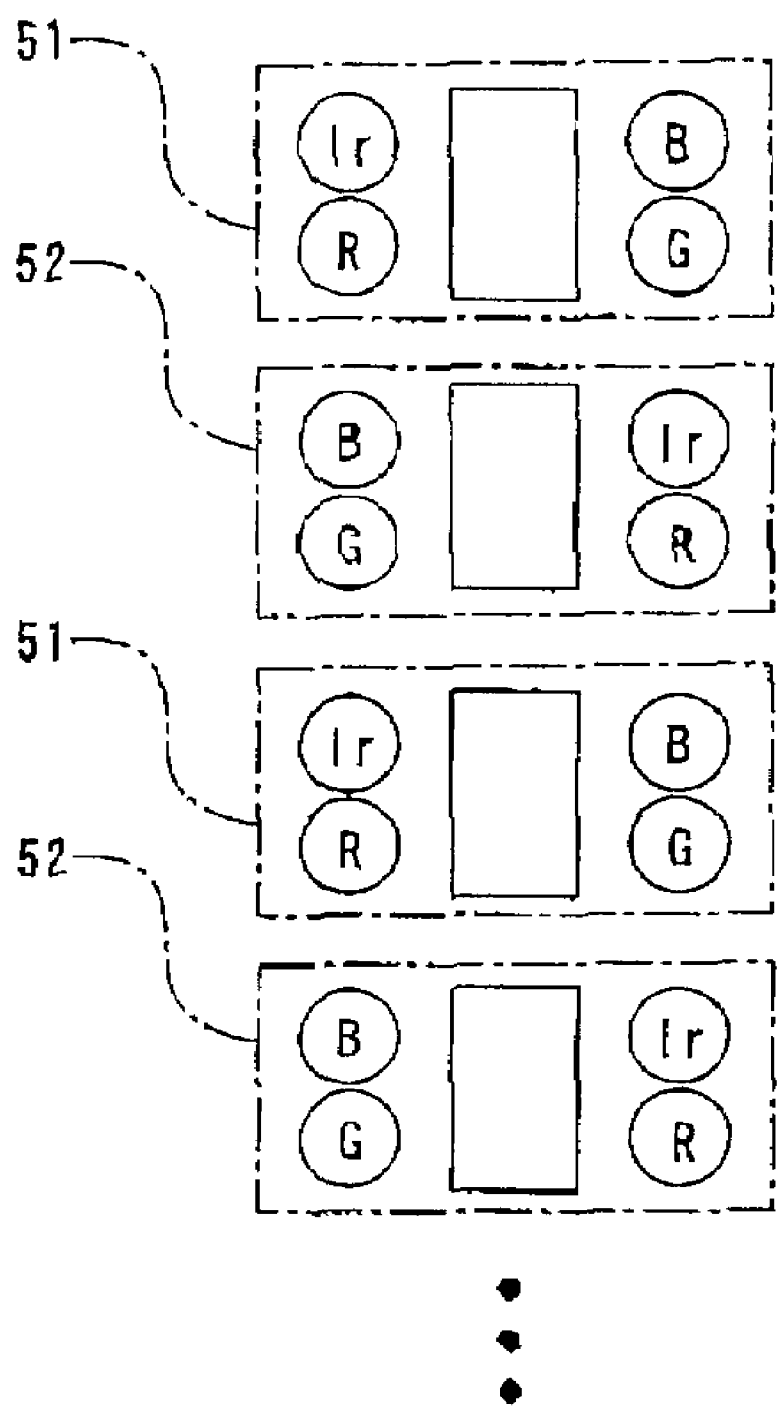
FIG. 4 is used to explain the line sensor and the printing press according to the above embodiment and is a schematic diagram showing a first disposition pattern and a second disposition pattern.

FIGS. 1 to 4 are diagrams used to explain a line sensor according to an embodiment of the present invention and a printing press equipped with that line sensor FIG. 1 is a plan view schematically showing a configuration of the end portion of the line sensor. FIG. 2 is a diagram schematically showing a simplified configuration of the printing press equipped with the line sensor. FIG. 3 is a side view schematically showing the line sensor. FIG. 4 is a schematic diagram showing a first disposition pattern and a second disposition pattern.

In this embodiment, the line sensor of the present invention is applied to an offset rotary printing press.

As shown in FIG. 2, in the printing section of the printing press, upper and lower printing units 1, 1 are disposed up and down across ribbon-shaped printing paper 5 which continuously travels along its traveling route. Each printing unit 1 includes a plate cylinder 4 having a printing plate mounted thereof and a blanket cylinder 3.

Each printing unit 1 further includes an ink fountain roller 6 and an ink supply section 8 of an ink key type in which a plurality of ink keys 7 are arranged in the axial direction of the ink fountain roller 6, (In FIG. 2, only the ink supply section 8 of the upper printing unit 1 is shown.)

Ink is supplied from the gap between the ink fountain roller 6 and each ink key 7 of the ink supply section 8 to the plate cylinder 4 through a plurality of ink rollers not shown, the supplied ink adheres to the lipophilic region of the printing plate, and the ink adhering to this printing plate is transferred onto the printing paper 5 through the blanket cylinder 3, whereby printed images 2 are continuously formed on both sides of the printing paper 5.

As described above, the ink keys 7 of the ink supply section 8 are arranged in the width direction of the printing paper 5. In the ink supply section 8 of this type, a supply of ink can be adjusted in key-width units by adjusting the gap between the ink key 7 and the ink fountain roller 6 (referred to as the key opening). The key opening of each ink key 7 is automatically adjustable by an ink actuator not shown and is controlled by a controller 20.

On the downstream side in the traveling direction of the printing unit 1, a line sensor 9 is disposed above the printing paper 5 to detect the color density of each printed image 2 on the upper side of the printing paper 5. The result of detection of the line sensor 9 is input to the controller 20. In response to the detection result of the color density of the printed image 2 input from the line sensor 9, the controller 20 is constructed to set and control the key opening of each ink key 7 so that the color density of the printed image 2 reaches a preset target color density.

The line sensor 9 is disposed at a position facing a guide roller 10, which guides the traveling route of the printing paper 5, across the traveling route of the printing paper 5.

The traveling route of the printing paper 5 is curved along the peripheral surface of the guide roller 10 so that the printing paper 5 can reliably travel along the peripheral surface of the guide roller 10. Also, the guide roller 10 is colored black so that light to be transmitted from the guide roller 10 to the line sensor 9 through the printing paper 5 can be reduced or shut out.

It is preferable that the detecting area X (see FIG. 3), at which the traveling direction of the printing paper 5 is curved along the peripheral surface of the guide roller 10, be downwardly or upwardly convex. It is also preferable that the tangential line of the curved portion near the detecting area X (e.g., a tangential line P in FIG. 3) be horizontal.

That is, the printing press is preferably provided with space so that the line sensor 9 can be installed horizontally. This can prevent accuracy of detection from being reduced by the inclination of the line sensor 9 caused by its gravity because of long-term use, compared with the case where the line sensor 9 is installed at a position inclined from the horizontal direction.

Note that on a further downstream side of the upstream line sensor 9, a downstream line sensor (not shown) is provided below the printing paper 5 to detect the color density of each printed image (not shown) on the underside of the printing paper 5 and is electrically connected with the controller 20. That is, even in the case where the printing paper 5 has images printed on both sides, the printed images on both sides can be detected. Note that it is preferable to provide a partition between the upstream line sensor 9 and the downstream line sensor to block the light so that the light of the light source of the upstream line sensor 9 has no influence on the downstream line sensor and also the light of the light source of the downstream line sensor has no influence on the upstream line sensor 9, or it is preferable to dispose both line sensors at positions where they do not influence each other by light.

Next, a configuration of the line sensor 9 will be described. As shown in FIG. 3, the line sensor 9 includes a light-receiving section 41, a first light source section 42, a second light source section 43, a case 44, a reflected light adjustment lens 46, first lenses (irradiated light adjustment lenses) 47, and second lenses (irradiated light adjustment lenses) 48.

The line sensor 9 should be disposed so that a plane containing the tangential line P of the guide roller 10 is parallel to the bottom surface of the case 44 with a predetermined distance L between the plane and the bottom surface, but in this example, there is an installing error (manufacturing tolerance) D caused when installing the line sensor 9.

It is desirable that the predetermined distance L be set as short as possible to efficiently irradiate light from each of the light source sections 42, 43 to the printing paper 5. However, the predetermined distance L cannot be made short mechanically in order to allow the passing of a paper passing unit that passes paper through the printing press.

The light-receiving section 41 is disposed in the center of the case 44, the reflected light adjustment lens 46 being disposed between the printing paper 5 and the light-receiving section 41. The reflected light adjustment lens 46 has a lens curvature set so that as much of the light diffusely reflected from the printing paper 5 as possible is focused on the light-receiving section 41.

The first light source section 42 and second light source section 43 are disposed at symmetrical positions with respect to the printing paper conveying direction across the light-receiving section 41. The first light source section 42 and second light source section 43 have an infrared (Ir) light-emitting diode 42A, a red (R) light-emitting diode 42B, a green (G) light-emitting diode 43A, and a blue (E) light-emitting diode 43B (see FIG. 1), as described later. The first light source section 42 and second light source section 43 are also referred to as a light source section.

The detecting area X, provided for detecting the color tone of the light reflected from the printed image 2 of the printing paper 5 during travel, extends in a straight line in the paper width direction and is set at a position where the printing paper 5 travels along the peripheral surface of the guide roller 10. The light source sections 42, 43 are oriented so that light of each color of infrared (Ir), red (R), green (G), and blue (B) colors is irradiated to the detecting area X extending in the width direction of the printing paper 5.

The first lenses 47 are respectively disposed in front of the light-emitting portions of the light-emitting diodes 42A, 42B of the first light source section 42, while the second lenses 48 are respectively disposed in front of the light-emitting portions of the light-emitting diodes 43A, 43B of the second light source section 43. That is, the first lenses 47 are provided between the first light source section 42 and the detecting area X, while the second lenses 48 are provided between the second light source section 43 and the detecting area X.

The respective lens curvatures of the first and second lenses 47, 48 are set so that the light from the first and second light source sections 42, 43 is uniformly irradiated at a predetermined degree of diffusion to the printing paper 5 passing through the detecting area X.

As shown in FIG. 1, the light-receiving section 41 is formed from a plurality of light-receiving sensors 41A such as photodiodes for receiving the reflected light from the printing paper 5. The light-receiving sensors 41A are disposed in a row in the paper width direction so as to correspond to the length in the paper width direction of the detecting area X.

The first light source section 42 and second light source section 43 are equipped with infrared light-emitting diodes 42A, red light-emitting diodes 42B, blue light-emitting diodes 43A, and green light-emitting diodes 43A, as light sources of a plurality of colors.

In the first light source section 42 and second light source section 43, the light-emitting diodes 42A, 42B, 43A, 43B are disposed in a straight row in parallel to the light-receiving sensors 41A of the light-receiving section 41 so that they are line symmetrical in the paper conveying direction with respect to the light-receiving section 41.

Now, a description will be given of a configuration of the light-emitting diodes 42A, 42B, 43A, 43B in the first light source section 42 and second light source section 43 which is the particularly important feature of the present invention.

As shown in FIG. 1, in the first light source section 42, the infrared (Ir) red (R), blue (B), and green (G) light-emitting diodes 42A, 42B, 43A, 43B are disposed in order of Ir→R→B→G from left side toward the paper conveying direction so that two light-emitting diodes correspond to one light-receiving sensor 41A.

On the other hand, in the second light source section 43, the blue (B), green (G), infrared (Ir), and red (R) light-emitting diodes 43A, 43B, 42A, 42B are disposed in order of B→G→Ir→R from left side toward the paper conveying direction so that two light-emitting diodes correspond to one light-receiving sensor 41A.

Because light-receiving sensors are expensive, in this embodiment two light-emitting diodes are disposed so as to correspond to one light-receiving sensor 41A. However, four light-emitting diodes may be disposed so as to correspond to one light-receiving sensor 41A. In this case, the light-emitting diodes in the first light source section 42 may be disposed in order of Ir→R→B→G, while the light-emitting diodes in the second light source section 43 may be disposed in order of B→G→Ir→R.

Now, the infrared light-emitting diode 42A and red light-emitting diode 42B are referred to as a first color light source group, while the green light-emitting diode 43A and blue light-emitting diode 43B are referred to as a second color light source group.

That is, as shown in FIG. 4, in the light-receiving section 41 and light source sections 42, 43, first disposition patterns 51, in which the light-emitting diodes (infrared and red light-emitting diodes 42A and 42B) of the first color light source group are disposed on one side (upstream side) of the light-receiving sensor 41A and the light-emitting diodes (blue and green light-emitting diodes 43A and 43B) of the second color light source group are disposed on the other side (downstream side) of the light-receiving sensor 41A, and second disposition patterns 52, in which the light-emitting diodes (blue and green light-emitting diodes 43A and 43B) of the second color light source group are disposed on the upstream side of the light-receiving sensor 41A and the light-emitting diodes (infrared and red light-emitting diodes 42A and 42B) of the first color light source group are disposed on the downstream side of the light-receiving sensor 41A, are alternately disposed in the paper width direction.

In other words, in the first light source section 42 and second light source section 43, the first color light source group (infrared and red light-emitting diodes 42A and 42B) and the second color light source group (blue and green light-emitting diodes 43A and 43B) are cross-stitched.

The controller 20 is used to control the key opening of each ink key 7 based on each color density detected by the line sensor 9, but the gap in the paper width direction between the light-receiving sensors 41A is sufficiently short compared with the width of each of the ink keys 7 arranged in the paper width direction. For this reason, in the key zone for the ink keys 7, a plurality of light-receiving sensors 41A are arranged and each ink key 7 is controlled based on detection information obtained from these light-receiving sensors 41A.

The line sensor and the printing press equipped with this according to the above embodiment of the present invention are configured as described above. Therefore, when an installing error D occurs in installing the line sensor 9, the installing error D causes an angular difference to occur between the irradiation angle θ of the light irradiated from the first light source section 42 to the printing paper 5 and the irradiation angle θ' of the light irradiated from the second light source section 43 to the printing paper 5. Because the irradiation angles θ and θ' differ from each other, the light irradiated from the second light source section 43 (second irradiated light) is greater in light quantity supplied onto the printing paper 5 than the light irradiated from the first light source section 42 (first irradiated light). However, the first irradiated light and second irradiated light contain the light components irradiated from the Ir, R, G, and B light-emitting diodes 42A, 42B, 43A, and 43B, so even if the first irradiated light and second irradiated light are not uniform in light quantity, the Ir, R, G, and B components contained in the first irradiated light and second irradiated light can be prevented from becoming non-uniform in light quantity. Thus, an error between the detection result of the color density of a printed image and the actual color density can be suppressed.

The position at which the printing paper 5 travels along the peripheral surface of the guide roller 10 is set to the detecting area X. Accordingly, the printing paper 5 traveling along the detecting area X is forced against the peripheral surface of the guide roller 10, whereby the flapping of the printing paper 5 is suppressed and color-density detection accuracy can be further increased.

Thus, based on the result of the color-density detection which is high in detection accuracy, the key opening of each ink key 7 is set in the controller 20, so the key opening (ink supply) can be suitably controlled.

The light-receiving section 41 and light source sections 42, 43 are configured so that one first light source group (infrared and red light-emitting diodes 42A and 42B) is disposed in one of the two light source sections 42, 43, and one second light source group (blue and green light-emitting diodes 43A and 43B) is disposed in the other of the two light source sections 42, 43. The light-receiving section 41 and light source sections 42, 43 are also configured so that the number of light-receiving sensors 41A and the number of the light-emitting diodes 42A, 42B, 43A, and 43B of each color are the same. Accordingly, the Ir, R, G, and B light can be sufficiently supplied to the detecting area X corresponding to one light-receiving sensor 41A, while suppressing the number of light-emitting diodes 42A, 42B, 43A, and 43B.

The reason is that the output of the light-emitting diodes 42A, 42B, 43A, and 43B is correlated with the size of the light-emitting diode, and a light-emitting diode of larger size can have better output efficiency relative to size.

In this embodiment, by disposing the light-emitting diodes 42A, 42B, 43A, and 43B on both sides of the light-receiving sensor 41A, light-emitting diodes of a size which can obtain a sufficient quantity of irradiated light can be installed.

The first and second lenses 47, 48 are disposed in front of the light-emitting portions of the light-emitting diodes 42A, 42B, 43A, and 43B. Accordingly, the light irradiated from the light-emitting diodes 42A, 42B, 43A, and 43B can be properly diffused, and uniform light can be supplied to the printing paper 5 traveling along the detecting area X. Further, the non-uniformity in the color light components contained in the first irradiated light and second irradiated light is reduced, whereby color-density detection accuracy can be increased by the light-receiving sensor 41A.

Now, a description will be given of two alterations of the above embodiment of the present invention.

The alterations 1, 2 differ from the above-described embodiment only in a configuration of light-emitting diodes and light-receiving sensors forming first and second disposition patterns. The same parts as the above-described embodiment are not explained and are given the same reference numerals.

The first alteration will be described. The first alteration includes only three red, blue, and green light-emitting diodes 42B, 43A, and 43B, as light sources. Thus, the first alteration is different from the above-described embodiment in that it does not include an infrared light-emitting diode 42A.

That is, in the first alteration, a first color light source group comprises only the red light-emitting diode 42B, while a second color light source group, as with the above embodiment, comprises the blue and green light-emitting diodes 43A, 43B.

Figure 5A:
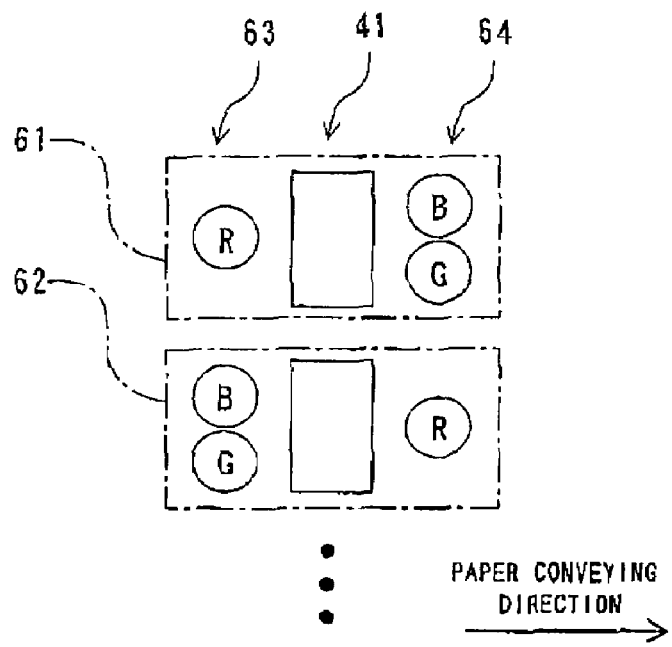
FIG. 5A and FIG. 5B are used to explain first and second alterations of the above embodiment and are schematic diagrams showing alterations of first and second disposition patterns.

As shown in FIG. 5A, in a light-receiving section 41 and first and second light source sections 63, 64, first disposition patterns 61, in which the light-emitting diode (red light-emitting diode 42B) of the first color light source group is disposed on the upstream side of a light-receiving sensor 41A and the light-emitting diodes (blue and green light-emitting diodes 43A, 43B) of the second color light source group are disposed on the downstream side of the light-receiving sensor 41A, and second disposition patterns 62, in which the light-emitting diodes (blue and green light-emitting diodes 43A, 43B) of the second color light source group are disposed on the upstream side of a light-receiving sensor 41A and the light-emitting diode (red light-emitting diode 42B) of the first color light source group is disposed on the downstream side of the light-receiving sensor 41A, are alternately disposed in the paper width direction.

In FIG. 5A, the configuration of the light-emitting diodes 42B, 43A, and 43B and the order of disposition are schematically exaggerated, so there are wide gaps between the light-emitting diodes 42B, 43A, and 43B disposed in the first and second light source sections 63, 64. In actuality, it is preferable to dispose the light-emitting diodes 42B, 43A, and 43B in a row in the paper width direction in each of the light source sections 63, 64 without a gap. In this manner, light-emitting diodes 42B, 43A, and 43B of large size and high efficiency can be used.

Figure 5B:
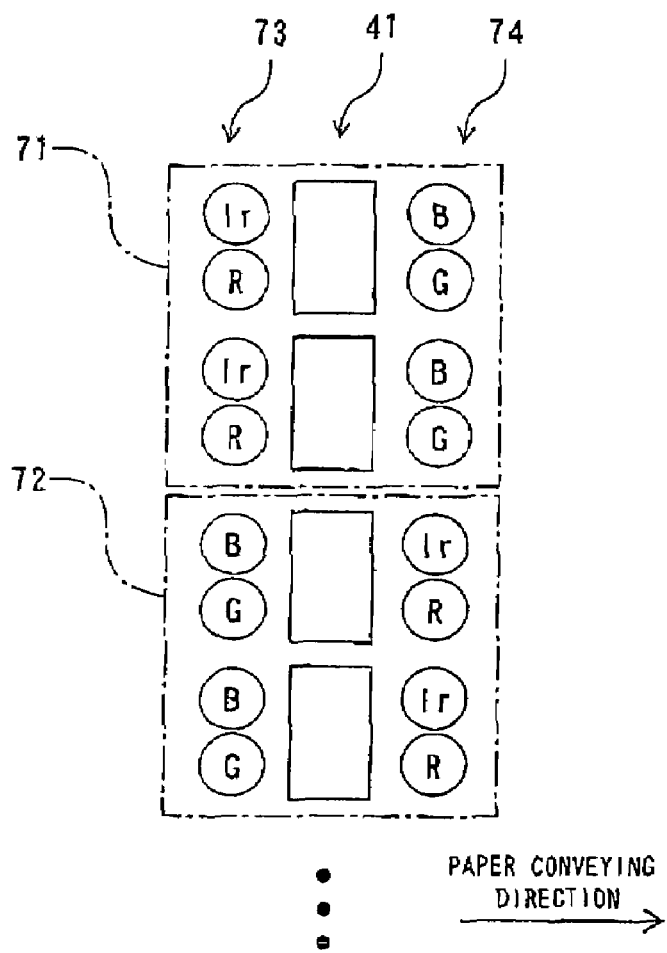

Next, the second alteration will be described. As shown in FIG. 5B, the second alteration, as with the above embodiment, uses four infrared, red, blue, and green light-emitting diodes 42A, 42B, 43A, and 43B, as light sources. However, the second alteration is different from the above embodiment in a configuration of first and second disposition patterns 71, 72.

That is, in a light-receiving section 41 and first and second light source sections 73, 74, first disposition patterns 71, in which the light-emitting diodes (infrared and red light-emitting diodes 42A, 42B) of the first color light source group are alternately disposed two by two on the upstream side of light-receiving sensors 41A and the light-emitting diodes (blue and green light-emitting diodes 43A, 43B) of the second color light source group are alternately disposed two by two on the downstream side of the light-receiving sensors 41A, and second disposition patterns 72, in which the light-emitting diodes (blue and green light-emitting diodes 43A, 43B) of the second color light source group are alternately disposed two by two on the upstream side of light-receiving sensors 41A and the light-emitting diodes (infrared and red light-emitting diodes 42A, 42B) of the first color light source group are alternately disposed two by two on the downstream side of the light-receiving sensors 41A, are alternately disposed in the paper width direction.

Even if the light-emitting diodes are thus configured, the non-uniformity in light quantity of the color light components resulting from an installing error can be reduced, whereby the color density of each printed image can be accurately detected.

Next, a third alteration will be described.

Figure 6:
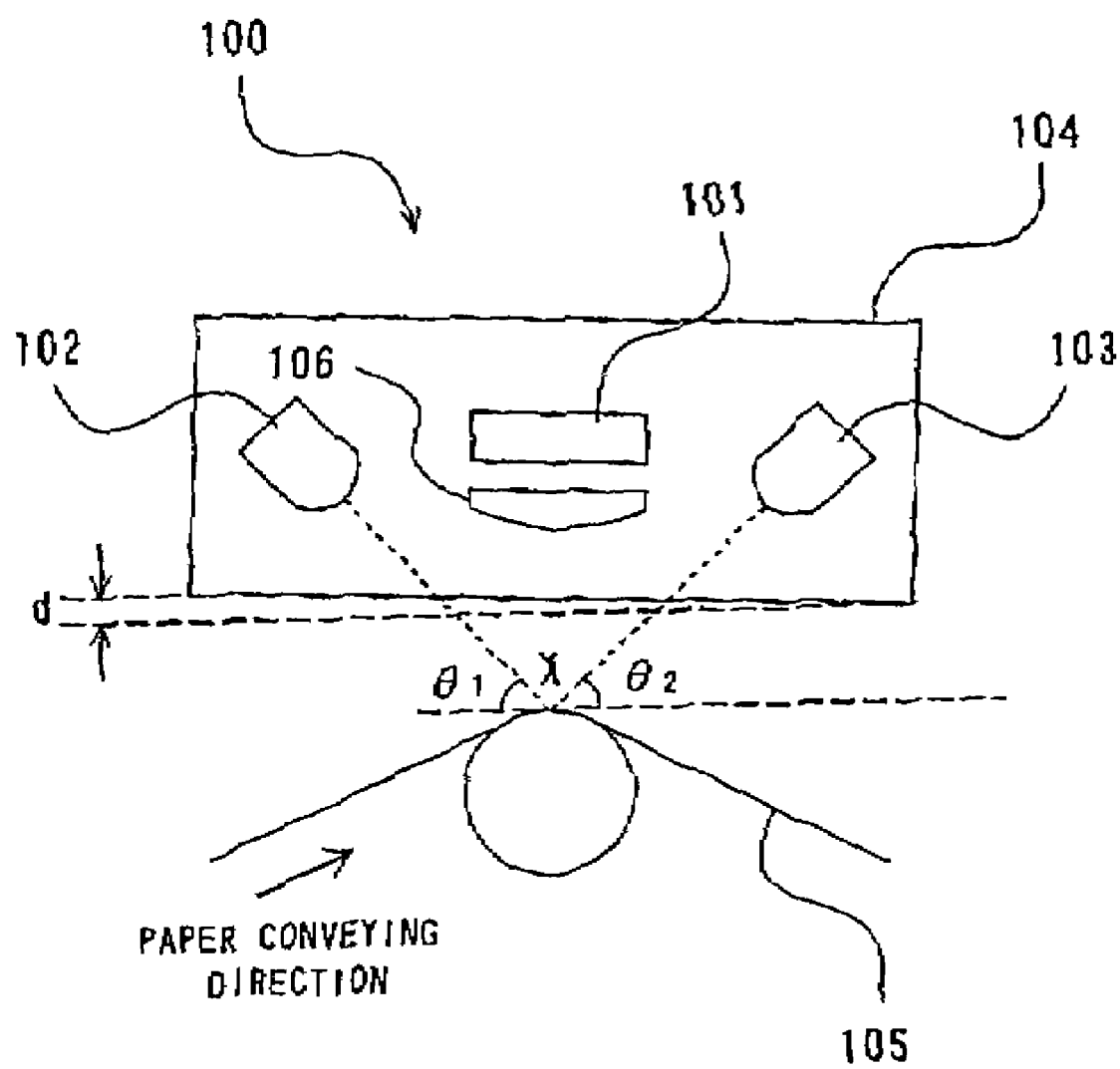
FIG. 6 is a schematic side view used to explain a line sensor according to a third alteration of the above embodiment.
Figure 7:
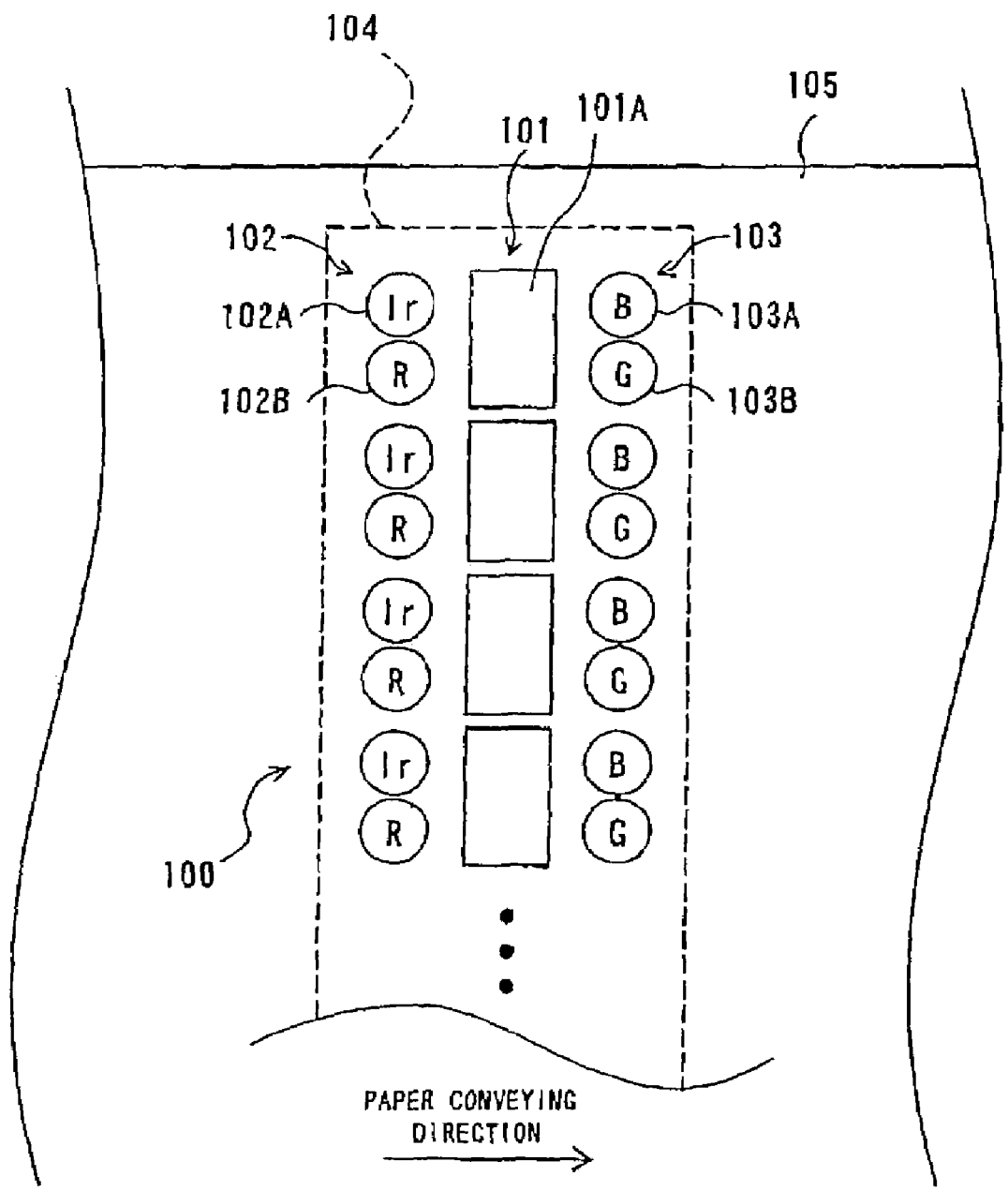
FIG. 7 is a schematic plan view used to explain the line sensor of the third alteration of the above embodiment.

FIG. 6 is a side view schematically showing a line sensor according to the third alteration. FIG. 7 is a plan view schematically showing the end portion of the line sensor of the third alteration.

As shown in FIG. 6, the line sensor 100 is disposed above the traveling route of printing paper 105 for a printing press (not shown), and includes a light-receiving section 101, a first light source section 102, a second light source section 103, a case 104, and a lens 106.

The first light source section 102 and second light source section 103 irradiate light of each color of infrared (Ir), red (R), green (G), and blue (B) colors to a detecting area X extending in the width direction of the printing paper 105, and the reflected light from the printed surface (printed image) on the printing paper 105 is received and read by the light-receiving section 101 through the lens 106.

As shown in FIG. 7, the light-receiving section 101 is formed from a plurality of light-receiving sensors 101A such as photodiodes for receiving the reflected light from the printing paper 105. The light-receiving sensors 101A are disposed in parallel to the detecting area X in a straight row in the width direction of the printing paper 105 so as to face the detecting area X on the traveling route.

The first light source section 102 and second light source section 103 are disposed in parallel to the detecting area X and light-receiving section 101 upstream and downstream of the light-receiving section 101, and are symmetrically disposed with respect to a plane formed by the detecting area X and light-receiving section 101.

On the first light source section 102, Ir (infrared) light-emitting diodes 102A and R (red) light-emitting diodes 102B are alternatively disposed and each pair of Ir and R light-emitting diodes is disposed to correspond to one light-receiving section 101A.

On the second light source section 103, B (blue) light-emitting diodes 103A and G (green) light-emitting diodes 103B are alternatively disposed and each pair of B and G light-emitting diodes is disposed to correspond to one light-receiving section 101A.

Thus, in the line sensor, the first light source section 102 has only two colors (infrared and red) of light-emitting diodes 102A and 102B disposed in a row, while the second light source section 103 has only two colors (blue and green) of light-emitting diodes 103A and 103B disposed in a row. This is for the intention of making the wiring path to each light-emitting diode structurally simpler, because electrical wiring for each light-emitting diode needs to be intensively performed for each color.

The light-receiving section 101, first light source section 102, second light source section 103, case 104, and lens 106 are assembled beforehand into the line sensor 100, and the assembled line sensor 100 is installed in the printing press.

The third alteration thus constructed makes it possible to detect the color density of each printed image accurately with simpler construction.

[Others]

While the present invention has been described with reference to the preferred embodiment thereof, the invention is not to be limited to the details given herein, but may be modified within the scope of the invention hereinafter claimed.

For example, in the above embodiment, while the line sensor according to the present invention is installed in the offset rotary printing press, it may be installed in sheet-fed printing presses and intaglio printing presses. The above embodiment uses light-emitting diodes as light sources, but the present invention can also select lamps that are usable as light sources.

While the above-described embodiment is configured such that the key opening (ink supply) is controlled based on the detection result obtained by the line sensor, the present invention is not limited to ink density control. For instance, the detection result may be used to sense defective printing. The defective printing indicates the case where part of an image has not been printed in ink, an image has become unclear because of much ink, or there is an abnormality which cannot be handled by normal ink density adjustment.

Based on the detection result obtained by the line sensor, it may be decided whether a printing plate has correctly been mounted on a plate cylinder. The detection result from the line sensor can be used in various applications.

In the above-described embodiment, the line sensor is installed above the traveling line of printing paper (inspecting object) to detect the reflected light from the printing paper that is traveling. The present invention is not limited to this embodiment. The line sensor may be constructed such that it travels in a conveying direction to detect the color density of an inspecting object which is stationary.

The present invention is not limited to the inspecting object used in the above-described embodiment. That is, the inspecting object is not limited to continuous printing web, but may be printing sheets or corrugated cardboard sheets. Furthermore, the inspecting object is not limited to paper, but may be metal sheets or resin film. The line sensor may be configured to detect defective products other than detective printing.

What is claimed is:

1. A line sensor comprising:
   a light source section for irradiating light of a plurality of colors to an inspecting object, said light source section having a plurality of light sources for each of said plurality of colors; and
   a light-receiving section for detecting reflected light from said inspecting object, said light-receiving section having a plurality of light-receiving sensors disposed in a row in a width direction of said inspecting object, said plurality of light sources being disposed in two rows so that said light-receiving section is interposed between said two rows;
   wherein the light sources of said plurality of colors are divided into a first color light source group and a second color light source group; and
   wherein first disposition patterns, in which said light sources of said first color light source group are disposed in one of the two rows of said light source section and said light sources of said second color light source group are disposed in the other row, and second disposition patterns, in which said light sources of said second color light source group are disposed in said one row and said light sources of said first color light source group are disposed in said other row, are alternately disposed in a row direction, and are disposed so as not to overlap when viewed along a direction perpendicular to the row direction.

2. The line sensor as set forth in claim 1, wherein said two rows of said light source section are disposed so that the two rows are plane-symmetrical with respect to said light-receiving section and said inspecting object.

3. The line sensor as set forth in claim 2, wherein said light sources of each color are disposed to correspond one by one to one light-receiving sensor of said light-receiving section.

4. The line sensor as set forth in claim 3, wherein said plurality of colors are infrared, red, green, and blue colors.

5. The line sensor as set forth in claim 4, wherein said first color light source group comprises said light sources of two colors of the infrared, red, green, and blue colors, and said second color light source group comprises said light sources of the remaining two colors.

6. The line sensor as set forth in claim 5, wherein irradiated light adjustment lenses are provided between said light sources and said inspecting object to adjust light irradiated from said light sources.

7. The line sensor as set forth in claim 6, wherein a reflected light adjustment lens is provided between said inspecting object and said light-receiving section to adjust a light quantity of said reflected light going from said inspecting object to said light-receiving section.

8. The line sensor as set forth in claim 7, wherein each of said light sources comprises a light-emitting diode.

9. The line sensor as set forth in claim 1, wherein said light sources of each color are disposed to correspond one by one to one light-receiving sensor of said light-receiving section.

10. The line sensor as set forth in claim 1, wherein said plurality of colors are infrared, red, green, and blue colors.

11. The line sensor as set forth in claim 10, wherein said first color light source group comprises said light sources of two colors of the infrared, red, green, and blue colors, and said second color light source group comprises said light sources of the remaining two colors.

12. The line sensor as set forth in claim 1, wherein irradiated light adjustment lenses are provided between said light sources and said inspecting object to adjust light irradiated from said light sources.

13. The line sensor as set forth in claim 1, wherein a reflected light adjustment lens is provided between said inspecting object and said light-receiving section to adjust a light quantity of said reflected light going from said inspecting object to said light-receiving section.

14. The line sensor as set forth in claim 1, wherein each of said light sources comprises a light-emitting diode.

15. A printing press comprising:
   a printing section for printing on printing paper said inspecting object; and
   the line sensor, as set forth in claim 8, which is provided downstream of said printing section.

16. The printing press as set forth in claim 15, further comprising:
   a guide roller for guiding said printing paper along a traveling route;

wherein said line sensor is disposed at a position facing said guide roller across said traveling route.

17. A printing press comprising:
a printing section for printing on printing paper as said inspecting object; and
the line sensor, as set forth in claim 1, which is provided downstream of said printing section.

18. The printing press as set forth in claim 17, further comprising:
a guide roller for guiding said printing paper along a traveling route;
wherein said line sensor is disposed at a position facing said guide roller across said traveling route.

* * * * *